March 29, 1932. D. SWENDSÉN ET AL 1,851,783
APPARATUS FOR THE MANUFACTURE OF SCREWS
Filed Nov. 3, 1927
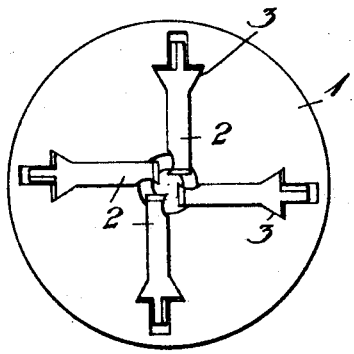
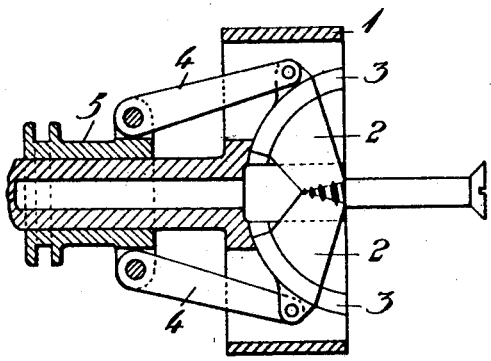
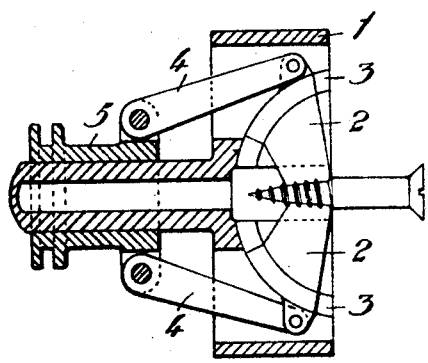
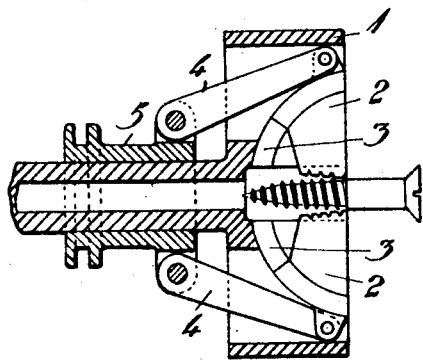
DAVID SWENDSEN
Per LEONARD STENMAN
INVENTORS Patented Mar. 29, 1932

1,851,783

UNITED STATES PATENT OFFICE

DAVID SWENDSÉN, OF NORRKOPING, AND PER LEONARD STENMAN, OF STOCKHOLM, SWEDEN

APPARATUS FOR THE MANUFACTURE OF SCREWS

Application filed November 3, 1927, Serial No. 230,705, and in Sweden November 23, 1926.

This invention relates to an apparatus for the manufacture of screws.

The object of this invention is to provide a simple device of the class described, by means of which the points as well as the cylindrical parts of screws can be formed.

To this end, cutting tools are provided, which are rotatable about an axis of their own as well as radially movable with respect to the blank which is to be threaded.

In carrying out our invention, cutting tools are provided which have a line of profile in conformity with the thread desired to be produced. Means are provided for setting the line of profile of each cutter at an angle to the axis of the blank to be cut at the beginning of the operation. In this manner, the point of the blank is threaded.

Further means are provided for turning the line of profile of each cutting tool, parallel or nearly so, to the axis of the blank being threaded, after the desired length of conical tip has been formed.

Futher means are provided to continually retract the several cutters from the axis of the blank during this change in the angle of the profile line of said cutters.

It is the particular object of this invention to provide all the above mentioned means in a simple, inexpensive structure.

Further objects and advantages of this invention will appear from the annexed detailed description of the drawings, in which, Fig. 1 is an end view of a thread cutting head embodying the distinctive features of the invention;

Figs. 2 and 3 and 4 are longitudinal sections of Fig. 1 at various stages of the cutting operation.

Referring to the drawings in detail, and particularly to Figs. 1 to 4 inclusive, 1 represents a head for holding cutters 2. Conventional means, not shown, are provided for giving head 1 a longitudinal motion. Such means may comprise the usual cam track or eccentric. The cutters 2 slide in tracks 3 which are curved with respect to the longitudinal axis of the head 1. Cutters 2 are connected by links 4 to a collar 5 which is movable with respect to the axis of head 1.

At the beginning of the threading operation, the cutters 2 rest in the inner ends of tracks 3 with their profile lines at an angle to the longitudinal axis of head 1. The screw blank to be threaded is brought between the cutters by any conventional form of chuck, and head 1 is rotated. As the point is being formed, head 1 is moved slowly backward, whereby cutters 2 travel toward the front end of tracks 3. In this manner, the cutters are constantly withdrawn radially from the screw blank until their profile lines are substantially parallel to the axis of said blank.

It is to be understood that the profile of the finished screw depends on the configuration of tracks 3 which may be varied as desired.

Having thus described various embodiments of our invention, which embodiments are not to be taken as limitative but rather demonstrative, what is claimed as new and desired to be protected by Letters Patent, is:

In a screw threading apparatus, in combination, a rotary cutter holding head having radial openings and arcuate guideways in the walls thereof, a plurality of cutters mounted in said openings and operatively connected with said guideways, said cutters being provided with profile lines which are supported by said guideways at an angle to the longitudinal axis of the blank to be threaded at the beginning of the cutting operations, and means for changing the angle of the cutters comprising a link for each cutter connected to the latter at one end, and a collar movable axially of said head and to which the other end of each link is connected.

In testimony whereof we have affixed our signatures.

DAVID SWENDSÉN.
PER LEONARD STENMAN.